United States Patent
Wu et al.

(10) Patent No.: US 7,403,086 B2
(45) Date of Patent: *Jul. 22, 2008

(54) GROUND FAULT CIRCUIT INTERRUPTER WITH REVERSE WIRING PROTECTION

(75) Inventors: Zhixin Wu, Zhejiang (CN); Yinxian Wang, Zhejiang (CN); Kuidong Zhang, Zhejiang (CN)

(73) Assignee: General Protecht Group U.S., Inc., Atlanta, GA (US)

( * ) Notice: Subject to any disclaimer, the term of this patent is extended or adjusted under 35 U.S.C. 154(b) by 127 days.

This patent is subject to a terminal disclaimer.

(21) Appl. No.: 11/184,649

(22) Filed: Jul. 19, 2005

(65) Prior Publication Data

US 2006/0018062 A1    Jan. 26, 2006

Related U.S. Application Data

(60) Division of application No. 10/386,488, filed on Mar. 13, 2003, now Pat. No. 6,954,125, which is a continuation-in-part of application No. 10/294,714, filed on Nov. 15, 2002, now Pat. No. 6,946,935.

(30) Foreign Application Priority Data

Oct. 9, 2002    (CN) .................................. 02 1 31108

(51) Int. Cl.
H01H 73/00 (2006.01)
H01H 73/12 (2006.01)
H01H 75/00 (2006.01)
H01H 83/06 (2006.01)

(52) U.S. Cl. .............................. 335/18; 361/42; 361/44; 361/46; 361/49

(58) Field of Classification Search .................... 335/18
See application file for complete search history.

(56) References Cited

U.S. PATENT DOCUMENTS

| | | | | |
|---|---|---|---|---|
| 4,034,266 A | * | 7/1977 | Virani et al. | 361/42 |
| 4,386,338 A | | 5/1983 | Doyle et al. | |
| 4,518,945 A | | 5/1985 | Doyle et al. | |
| 4,521,824 A | * | 6/1985 | Morris et al. | 361/45 |
| 4,595,894 A | * | 6/1986 | Doyle et al. | 335/18 |
| 4,719,437 A | | 1/1988 | Yun | |
| 4,802,052 A | | 1/1989 | Brant et al. | |
| 4,851,951 A | | 7/1989 | Foster, Jr. | |
| 4,893,101 A | * | 1/1990 | Robitaille | 335/18 |

(Continued)

Primary Examiner—Elvin Enad
Assistant Examiner—Mohamad A Musleh
(74) Attorney, Agent, or Firm—Morris Manning Martin LLP; Tim Tingkang Xia, Esq.

(57) ABSTRACT

A new type of switching mechanism for a ground fault circuit interrupter (GFCI) with reverse wiring protection preferably includes two pairs of fixed contact holders, each member of each pair having at least one fixed contact at one end; a pair of movable contact holders, each having an end having one or more of movable contacts, each movable contact being arranged for contacting one of the fixed contacts; and a movable assembly that moves between first and second positions, wherein the first position is a position in which each of the contacts of the fixed contact holders makes contact with one of the contacts of the movable end of one of the movable contact holders, and wherein the second position is a position in which the contacts of the fixed contact holders are separated from the contacts of the movable contact holders.

10 Claims, 15 Drawing Sheets

U.S. PATENT DOCUMENTS

| | | | |
|---|---|---|---|
| 5,202,662 A | 4/1993 | Bienwald et al. | |
| 5,223,810 A | 6/1993 | Van Haaren | |
| 5,224,006 A | 6/1993 | MacKenzie et al. | |
| 5,229,730 A | 7/1993 | Legatti et al. | |
| 5,477,412 A | 12/1995 | Neiger et al. | |
| 5,510,760 A * | 4/1996 | Marcou et al. | 335/18 |
| 5,517,165 A | 5/1996 | Cook | |
| 5,594,398 A | 1/1997 | Marcou et al. | |
| 5,600,524 A | 2/1997 | Neiger et al. | |
| 5,654,857 A | 8/1997 | Gershen | |
| 5,661,623 A * | 8/1997 | McDonald et al. | 361/42 |
| 5,680,287 A * | 10/1997 | Gernhardt et al. | 361/42 |
| 5,805,397 A | 9/1998 | MacKenzie | |
| 5,933,063 A * | 8/1999 | Keung et al. | 335/18 |
| 5,956,218 A | 9/1999 | Berthold | |
| 5,963,408 A | 10/1999 | Neiger et al. | |
| 6,040,967 A | 3/2000 | DiSalvo | |
| 6,052,265 A | 4/2000 | Zaretsky et al. | |
| 6,111,733 A | 8/2000 | Neiger et al. | |
| 6,226,161 B1 | 5/2001 | Neiger et al. | |
| 6,246,558 B1 | 6/2001 | DiSalvo et al. | |
| 6,252,407 B1 | 6/2001 | Gershen | |
| 6,282,070 B1 | 8/2001 | Ziegler et al. | |
| 6,282,882 B1 | 9/2001 | Dudd, Jr. et al. | |
| 6,288,882 B1 | 9/2001 | DiSalvo et al. | |
| 6,309,248 B1 | 10/2001 | King | |
| 6,381,112 B1 | 4/2002 | DiSalvo | |
| 6,437,953 B2 * | 8/2002 | DiSalvo et al. | 361/42 |
| 6,671,145 B2 | 12/2003 | Germain et al. | |
| 6,788,173 B2 * | 9/2004 | Germain et al. | 335/18 |
| 6,946,935 B2 * | 9/2005 | Wu et al. | 335/18 |
| 6,954,125 B2 * | 10/2005 | Wu et al. | 335/18 |
| 7,031,125 B2 * | 4/2006 | Germain et al. | 361/42 |
| 2002/0067582 A1 * | 6/2002 | Germain et al. | 361/42 |
| 2003/0206085 A1 * | 11/2003 | Germain et al. | 335/166 |
| 2006/0262468 A1 * | 11/2006 | Richter et al. | 361/42 |
| 2006/0274461 A1 * | 12/2006 | Ochoa et al. | 361/42 |
| 2007/0014058 A1 * | 1/2007 | Chan et al. | 361/42 |

* cited by examiner

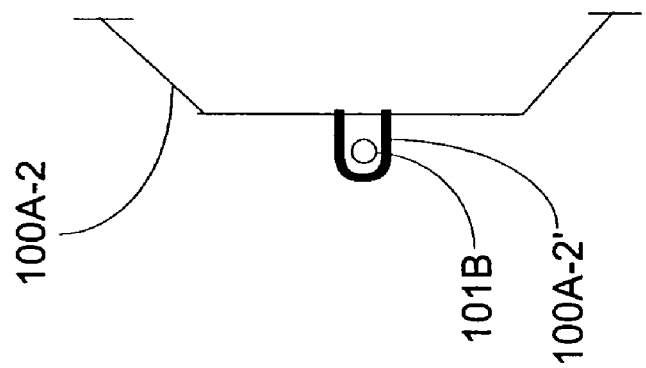
Figure 13C
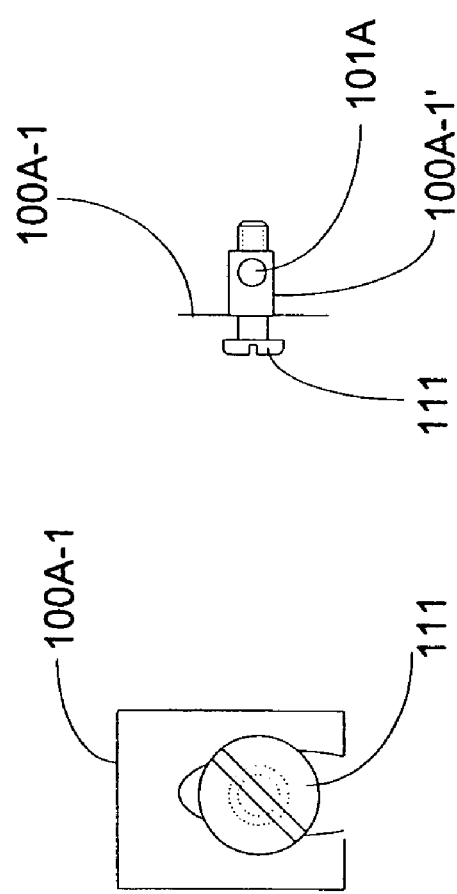
Figure 13B
Figure 13A

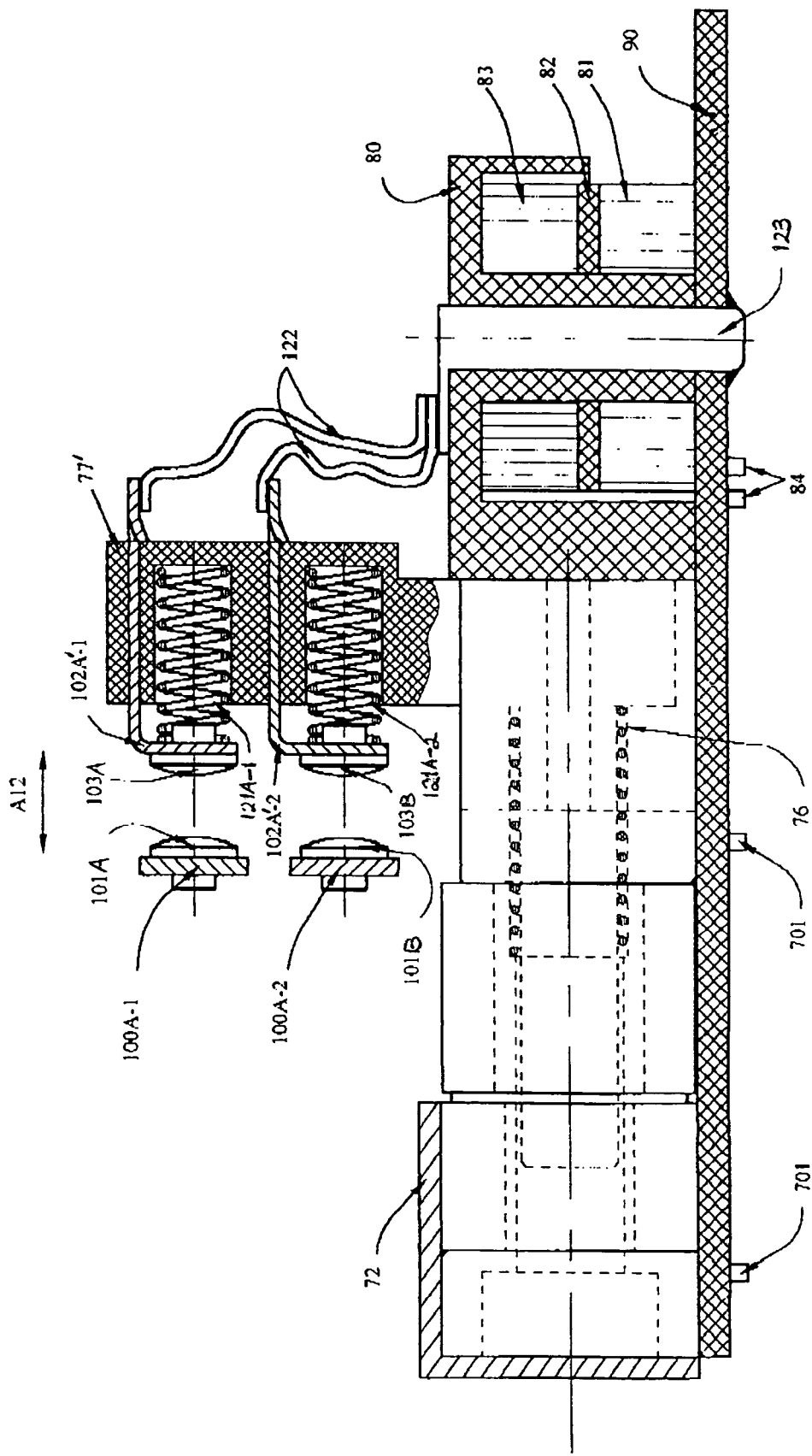

GROUND FAULT CIRCUIT INTERRUPTER WITH REVERSE WIRING PROTECTION

CROSS-REFERENCE TO RELATED PATENT APPLICATION

This application is a divisional application of, and claims benefit of U.S. patent application Ser. No. 10/386,488, filed Mar. 13, 2003, now U.S. Pat. No. 6,954,125 entitled "Ground Fault Circuit Interrupter with Reverse Wiring Protection," by Zhixin Wu, Yinxian Wang, and Kuidong Zhang, the disclosure of which is hereby incorporated herein by reference in its entirety, which status is allowed and itself is a continuation-in-part of U.S. patent application Ser. No. 10/294,714, filed Nov. 15, 2002, now U.S. Pat. No. 6,946,935 entitled "Ground Fault Circuit Interrupter with Reverse Wiring Protection," by Zhixin Wu, Yinxian Wang, and Kuidong Zhang, the disclosure of which is hereby incorporated herein by reference in its entirely, which status is allowed and itself claims priority of Chinese Patent Application No. 02131108.0, filed Oct. 9, 2002, which is incorporated herein by reference in its entirely.

BACKGROUND OF THE INVENTION

1. Field of the Invention

The present invention relates to a ground fault circuit interrupter (GFCI) for load ground-fault protection. More specifically, the invention relates to a GFCI receptacle utilizing an electromagnetic tripper and providing reverse wiring protection.

2. Discussion of Related Art

Ground fault circuit interrupter (GFCI) devices are designed to trip in response to the detection of a ground fault condition at an AC load. For example, the ground fault condition may result when a person comes into contact with the line side of the AC load and an earth ground at the same time, a situation that can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, a circuit breaker within the GFCI device is immediately tripped to an open condition, thereby opening both sides of the AC line and removing all power from the load.

A GFCI generally includes a housing, a tripper, a reset button, a test button, a mounting strap with grounding strap and banding screw, a pair of movable contact holders with contacts, a pair of fixed contact holders with contacts, and a control circuit. Currently, GFCIs are widely used to prevent electric shock and fire caused by a ground fault.

In the past, a GFCI receptacle generally utilized a mechanical actuator, which limited the performance of such products, especially insofar as these GFCIs did not provide reverse wiring protection. In addition, these mechanical GFCIs required high standards in the quality of the parts and assembling work. Examples of mechanical GFCIs include those disclosed in U.S. Pat. No. 5,933,063 and U.S. Pat. No. 4,802,052.

The GFCI shown in U.S. Pat. No. 6,252,407 B1 has reverse wiring protection, but it is a visual alarm indicator signaling a miswiring condition to the installer, and if miswired (despite the visual alarm indicator) by connecting the line to the load, the GFCI can still be reset. Under such circumstances, an unknowing user, faced with a GFCI that has been miswired, may press the reset button, which, in turn, will cause the GFCI to be reset without reverse wiring protection available. And, such a GFCI that has been reset can very easily be tripped again in events like lightning strikes.

The design of these GFCIs allows two means of connection: the load can pass through the entry ports of the face portion or can alternatively connect through the load binding screws. Consequently, an installer or user can still mistakenly connect the line and the load in a reverse direction. When this occurs, without reverse wiring protection, the GFCI will function just as a common (non-GFCI) receptacle.

There is a need for a GFCI that, in order to improve the safety features of the receptacles, is capable of providing reserve wiring protection; is highly responsive; is convenient to assemble; and has improved functionality.

SUMMARY OF THE INVENTION

It is an object of the pesent invention to provide a GFCI circuit that has the above characteristics.

The ground fault circuit interrupter (GFCI) according to the present invention comprises a pair of first contact holders, each having a contact at one end; a pair of movable contact holders, each having a fixed end and a movable end, each of the movable ends having a contact; a movable assembly that moves between a first position and a second position, wherein the first position is a position in which each of the contacts of the first contact holders makes contact with one of the contacts of the movable end of one of the movable contact holders, and wherein the second position is a position in which the contacts of the first contact holders are separated from the contacts of the movable contact holders; an electromagnetic resetting component, which, when energized, causes the movable assembly to be in the first position; an electromagnetic tripping component, different from the electromagnetic resetting component, which, when energized, causes the movable assembly to be in the second position; and a control circuit, which, upon detection of a fault condition, energizes the electromagnetic tripping component, and which, after a reset switch is activated, energizes the electromagnetic resetting component.

One particular object of an embodiment of the present invention is to provide a GFCI receptacle with reverse wiring protection that incorporates an electromagnetic tripper and a corresponding control circuit.

The GFCI receptacle according to a first embodiment of the present invention comprises an electromagnetic tripper, a rear portion, a central body, a face portion, a test button, a reset button, an indicator, a mounting strap with a grounding strap and a binding screw, a pair of movable contact holders having one end fixed and the other end able to freely bias, a pair of fixed contact holders mounted on the central body, and a control circuit.

Because the tripper is electromagnetic, the GFCI receptacle carries out the breaking and making operation through the interaction of the relevant electromagnetic forces produced by the trip coil ($J_1$), the closing coil ($J_2$) produces, and the permanent magnet. Furthermore, by using the magnetic force of the permanent magnet to provide a retentive force on the tripper, the operating sensitivity is improved, and the GFCI is more energy efficient.

According to another feature of the invention, the GFCI is provided with reverse wiring protection in that the control circuit is de-energized when the GFCI is miswired by connecting the line to the load so that the GFCI receptacle can not be reset. When the GFCI is miswired, the face portion, particularly at the entry ports and the ground-prong-receiving openings that accommodate the three-wire plugs, is without a flow of electricity, which provides additional safety feature for human use.

A further object of the present invention is to provide an electromagnetic tripper that is electronically controlled. In such an embodiment (for example, the implementation shown in FIG. 10), the tripper comprises a permanent magnet, a coil framework, a trip coil, a closing coil, a plunger, a trip spring, a movable bracket, a balance frame, and a small spring providing a contact force for the movable contact holders. When the reset button is depressed, the closing coil will be energized and will produce an electromagnetic force that works with the magnetic force of the permanent magnet to act on the plunger to overcome the returning force of the trip spring and certain frictional forces, thereby closing the tripper, and the magnetic force of the permanent magnet maintains the tripper in the closed condition. Because the plunger and the movable bracket are coupled, the movement of the plunger directly drives the movable bracket to move in the same direction, and the movement of the movable bracket causes the balance frame to move. The movement of the balance frame lifts the removable contacts against the fixed contacts through the special shape of the movable contact holder (the movable contact holder has a V-shaped groove, and when it is in the tripping state, the bracket of the balance frame moves into the V-shaped groove). When the tripper is in the closed state, the movable contact connects with the fixed contacts, and the small spring associated with the balance frame provides a contact force to maintain good contact, thereby maintaining the GFCI receptacle in the normal operating condition.

When the GFCI receptacle of the above embodiment is energized, if a ground fault occurs at the load or there is a factitious fault current, the control circuit will gate a silicon controlled rectifier (SCR) into conduction to energize the trip coil. The trip coil will then produce an electromagnetic force in the direction which repels the magnetic force of the permanent magnet. The electromagnetic force and the returning force of the trip spring act on the plunger, thereby making the tripper open quickly.

Still another object of the present invention is to provide a special control circuit which mainly comprises a DC power source, integrated amplification circuit, sensing circuit, trip circuit, reset circuit, and test circuit. In one embodiment of the invention in which these objects are satisfied, four diodes form a full-wave bridge rectifier circuit. After the AC from the line is commutated by the rectifier circuit, there will be DC on the output terminal of the rectifier circuit. This embodiment includes an integrated amplification circuit, which may be a special IC (for example, of the type RV4145A or RV2145). The sensing circuit may include a sensor that comprises a sensing transformer and a neutral transformer. The AC line and neutral conductors pass through the transformers. In operation, the sensing transformer serves as a differential transformer for detecting a current leakage between the line side of the load terminal and an earth ground, while the neutral transformer detects current leakage between the neutral side of the load terminal and an earth ground. When an imbalance between the currents flowing in the line and neutral conductors of the AC supply is detected, a circuit breaker within the GFCI device is immediately tripped to an open condition, thereby opening both sides of the AC line and removing all power from the load. In the reset control circuit, the reset switch is connected to a silicon controlled rectifier (SCR). When the reset switch is closed, the SCR will be gated into conduction and will cause a closing coil connected with the SCR to be energized to thereby reset the GFCI. Simultaneously, a capacitor is connected to the reset switch to keep the closing coil energized for an instant. In this way, it prevents the closing coil from being burned out in the event that the current flowing through the closing coil is too large and the energized time is too long.

The power supply of the control circuit is connected to the AC supply of the GFCI, so when the GFCI is energized, the control circuit is also energized. However, if the GFCI is miswired by connecting the line to the load, the control circuit is de-energized, and the GFCI will not be able to be reset, achieving the reverse wiring protection function. Because the reset of the GFCI is electronically controlled, the operation is more convenient, and the action is more sensitive compared to GFCIs using mechanical means.

In a further embodiment of the invention, the movable contact holders, the movable assembly, and the fixed contacts are arranged so as to provide two separate contact points between movable contacts and fixed contacts on each side (phase and neutral) of the GFCI. In one sub-embodiment, the single movable contact holder on each side is replaced with two movable contact holder elements, each having a V-shaped bend, the two movable contact holder elements being placed against each other with the V-shaped bends arranged opposite each other. One end of each movable contact holder element has a movable contact, and the other end is joined with the other end of the other movable contact holder element and connected to a conductor coupled to one side of the line (i.e., either phase or neutral). In this arrangement, the movable contact holder elements remain together, and the movable contacts do not make contact with the fixed contacts, in the tripped state, while the movable contact holder elements are separated (by the movable assembly), and contact is made, when the GFCI is reset.

In a second sub-embodiment, the movable contact holder is mounted on the movable assembly and is connected to a flexible conductor on one end. The other end of the movable contact holder is provided with the two movable contacts, which make contact with the two fixed contacts when the movable assembly is in a first (closed) position and does not make contact when the movable assembly is in a second (tripped) position.

BRIEF DESCRIPTION OF THE DRAWINGS

The invention will now be described in further detail in conjunction with the accompanying drawings, in which:

FIGS. 13A-13C conceptually depict a split version of a fixed contact holder for use in connection with the embodiments shown in FIGS. 11, 12, and 15;

FIG. 15 is a detailed, sectional side view of the GFCI in the tripped condition, according to a modification of the embodiment of the invention shown in FIG. 12.

DETAILED DESCRIPTION OF THE PREFERRED EMBODIMENTS

Figure 1:
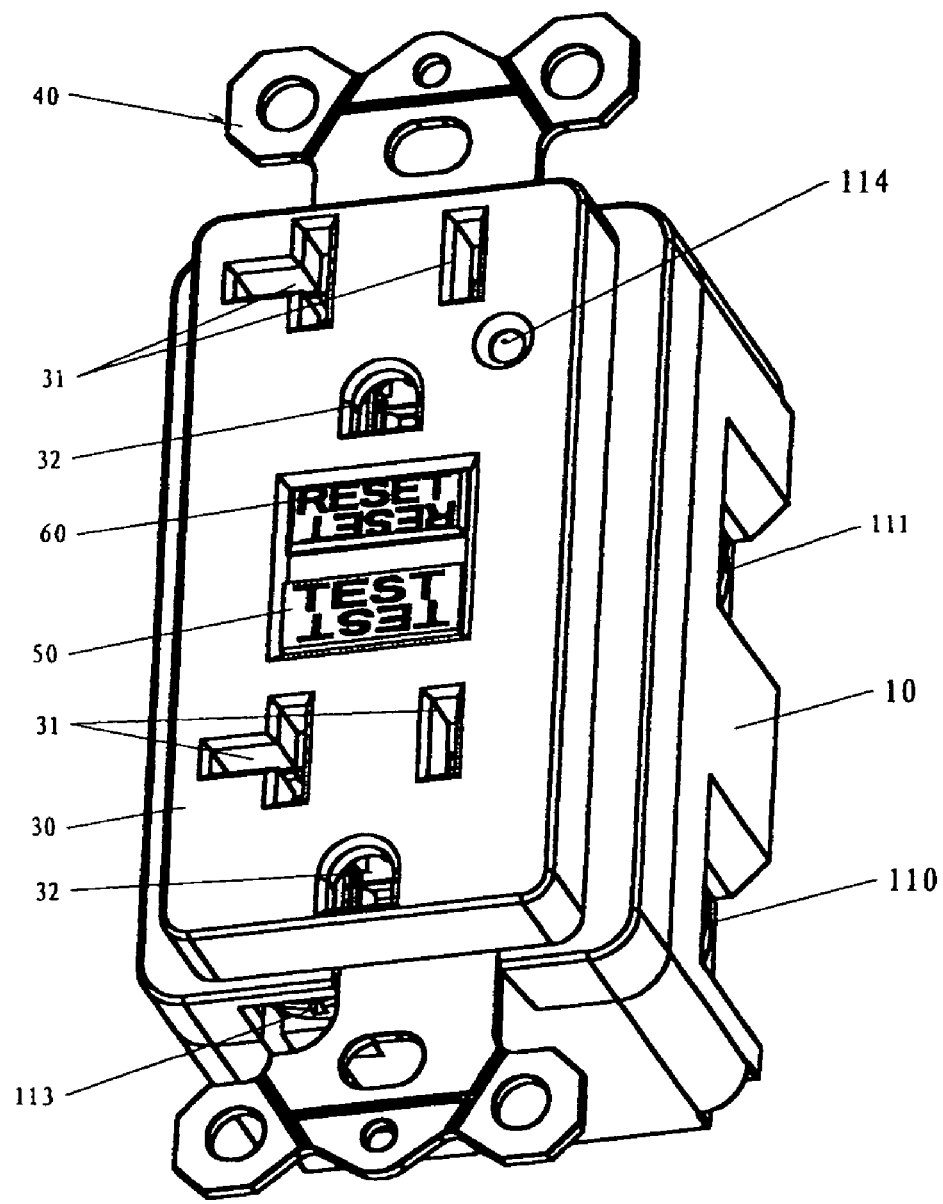
FIG. 1 is a perspective view of a GFCI according to an embodiment of the present invention.

FIG. 1 shows a view of the exterior of a GFCI according to an embodiment of the present invention. The GFCI receptacle has a housing consisting of a face portion 30, a central body 20 (not shown in FIG. 1, but appearing, for example, in FIG. 2) and a rear portion 10. The face portion 30 has entry ports 31 for receiving normal or polarized prongs of a male plug of the type normally found at the end of a lamp or appliance cord set (not shown), as well as ground-prong-receiving openings 32 to accommodate three-wire plugs. The GFCI receptacle also includes a mounting strap 40 for fastening the receptacle to a junction box, and the mounting strap 40 has a threaded opening to receive a screw 113 for connection to an external ground wire. A test button 50 extends through an opening in the face portion 30 of the housing. The test button 50 can be activated to test the operation of the circuit-interrupting portion disposed in the device. A reset button 60, which forms a part of a reset portion of the device, extends through an opening in the face portion 30 of the housing. The reset button is used to activate a reset operation, which reestablishes the electrical continuity in the open conductive paths. Electrical connections to existing household electrical wiring are made via binding screws 110 and 111, where the binding screw 110 is a line phase connection, and the binding screw 111 is a load phase connection. It should be noted that two additional binding screws (not shown) are located on the opposite side of the GFCI receptacle. An indicator 114 (generally a light-emitting diode (LED)) extends through the opening of the face portion 30 of the housing. When the GFCI is normally energized, the indicator is illuminated.

The GFCI illustrated in FIG. 1 may be rated, for example, at 20A. The present invention also provides other types of GFCIs, at various amperage ratings, and these GFCI receptacles all have two configurations, one without an indicator and the other with an indicator. Both configurations operate under the same principle. Therefore, the description below, while specifically for the rated 20A GFCI with an indicator, also applies to the other types of GFCIs.

Figure 2:
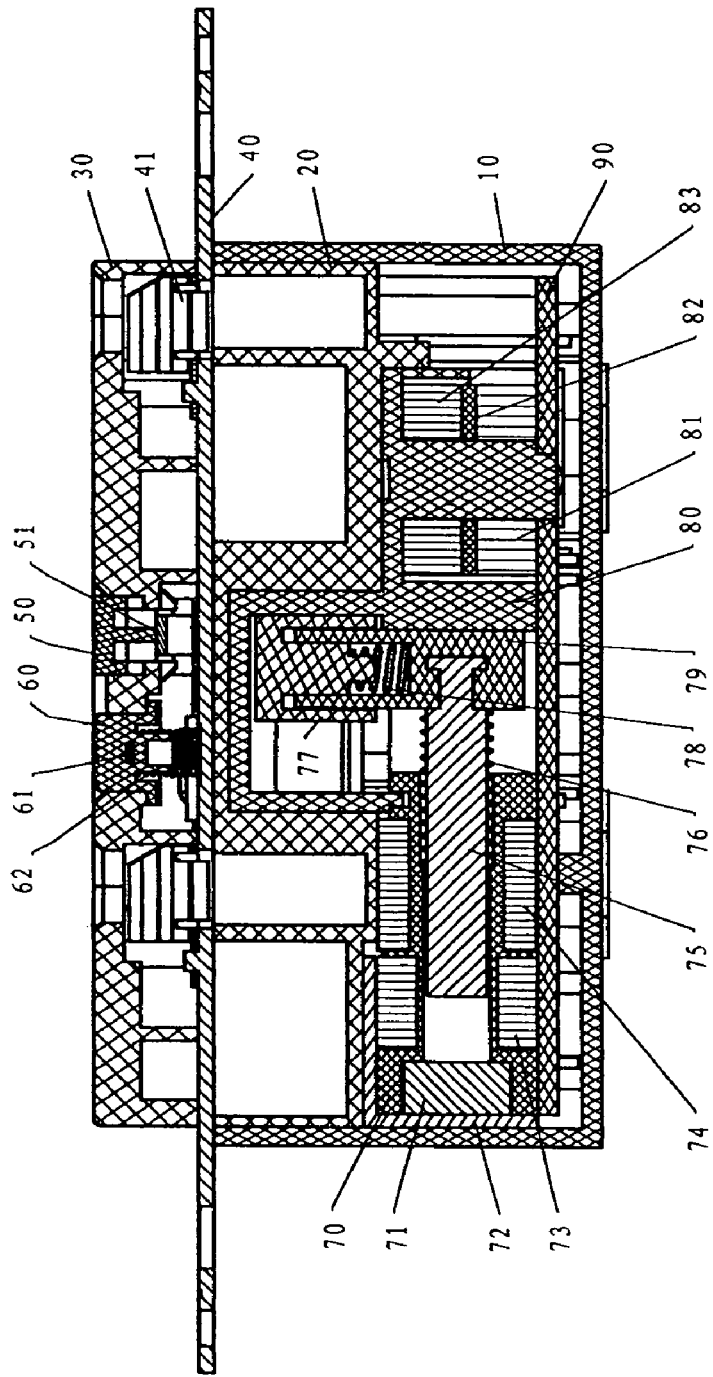
FIG. 2 is a side view, in longitudinal section, of the GFCI in FIG. 1 showing the relative positions of the assembly in the tripped condition.

Referring to FIG. 2, the assembled relation of the GFCI receptacle is shown in the tripped condition. All of the sub-assemblies and component parts are fixed mainly to the housing (consisting of the face portion 30, the central body 20 and the rear portion 10) of the GFCI. An electromagnetic tripper is built into the GFCI receptacle of the present invention. A permanent magnet 71 is set into one end of a coil framework 70, and covered by an outside shield cover 72. One end of the shield cover 72 is abutted against one side of the rear portion 10. The coil framework is mounted on a circuit board 90 by four binding pins. A circular core of sensor framework 80 is set into a fixed hole of the circuit board 90, and the sensor framework 80 is also mounted on the circuit board 90 by four binding pins. The U-shaped portion of the sensor framework 80 is set into a corresponding groove on the central body 20. There is an isolation layer 82 between the sensing transformer 81 and the neutral transformer 83. The sensing transformer 81 may be composed, for example, of high original magneto-conductivity magnetic alloy flakes and enamel-insulated wire. The neutral transformer 83 may, for example, be composed of ferrite (high μ value, large temperature modulus) and enamel-insulated wire. A plunger 75 is molded into the side of a movable bracket 79. The elasticity of a trip spring 76 makes one side of the movable bracket 79 abut against the sensor framework 80 in the trip condition. The upper side of the movable bracket 79 has a central hole, and a small spring 78 is set into it to prop up balance frame 77 and to provide a contact force for the contacts. Through the interaction of the magnetic force of the permanent magnet 71 and the electro-magnetic force that the trip coil 74 or the closing coil 73 produces in an energized condition, the plunger 75 activates the movable bracket 79 to drive the balance frame 77 to move back and forth in the U-shaped groove, as shown. Contact strap 61 is molded into the underside of reset button 60. One end of reset spring 62 props up the reset button 60, and the other end presses onto mounting strap 40. The test button 50 is propped up by test strap 51. In one embodiment of the GFCI, this arrangement ensures that the top surface of the test button 50 is substantially level with the surface of the face portion 30 until pressed.

Figure 3:
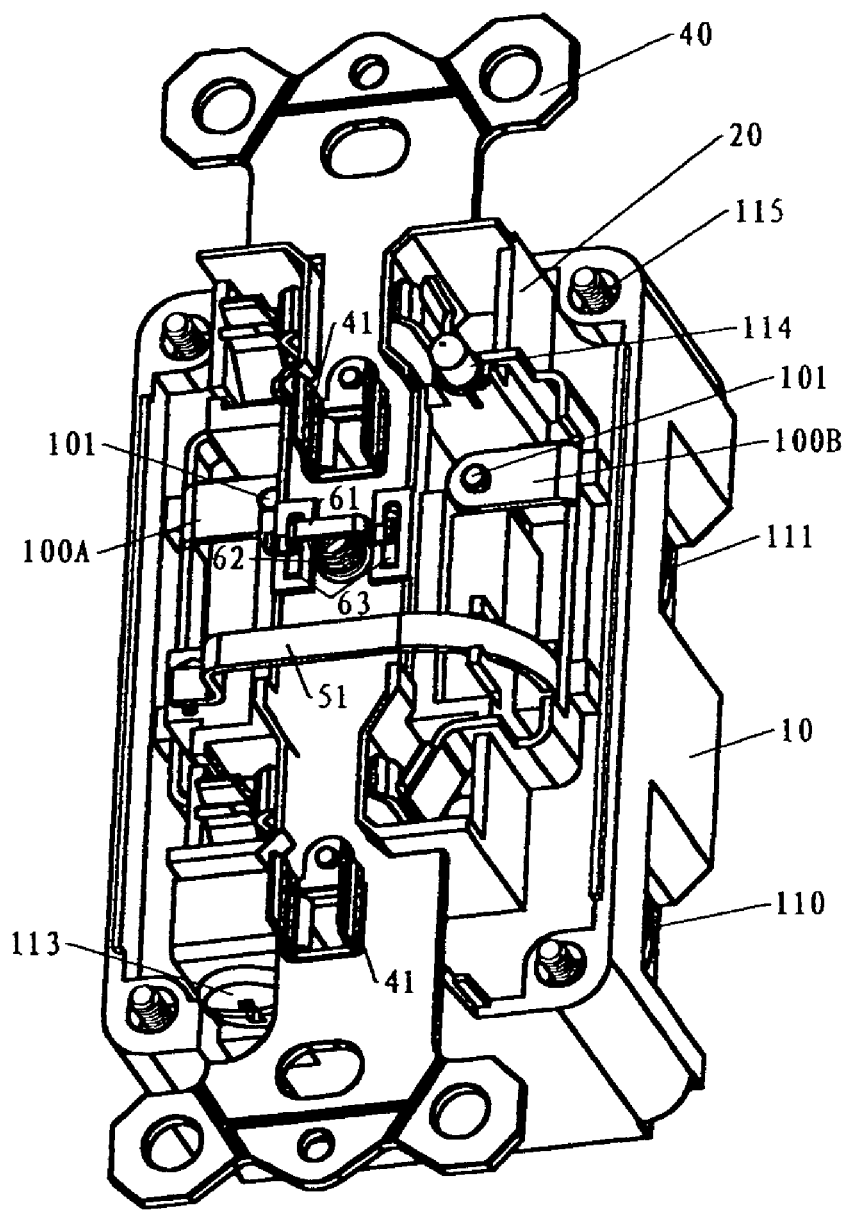
FIG. 3 is a perspective view of the GFCI in FIG. 1 with the face portion removed, showing the internal configuration of the GFCI of FIG. 1.

Referring to FIG. 3, a pair of fixed contact holders 100A and 100B with contacts 101 are mounted on the central body 20. A mounting strap 40 with grounding strap 41 and binding screw 113 is set onto the central body 20, and the face portion 30 impacts it. One end of a test strap 51 is set into a corresponding slot on the central body 20; its outside abuts against the inside of the fixed contact holder 100B; and the other end of the test strap 51 can flexibly contact with the test resistor 52 (shown, e.g., in FIG. 4). The contact strap 61, which is molded into the underside of the reset button 60, can flexibly contact the binding pins 63 through the action of the reset spring 62, which props up the reset button 60, thus controlling the reset action of the tripper.

FIGS. 2 and 3 also show the physical relationship among the mounting strap 40, the central body 20, and coil framework 70 (including both the trip coil 74 and the closing coil 73). In particular, these figures show that mounting strap 40 is physically separated from coil framework 70 by central body 20. Central body 20 may be constructed of, for example, an insulating material. Central body 20 may thus be constructed such that mounting strap 40 does not define a path of a magnetic field generated by either trip coil 74 or closing coil 73, i.e., such that mounting strap 40 is magnetically isolated from trip coil 74 and closing coil 73.

Figure 4:
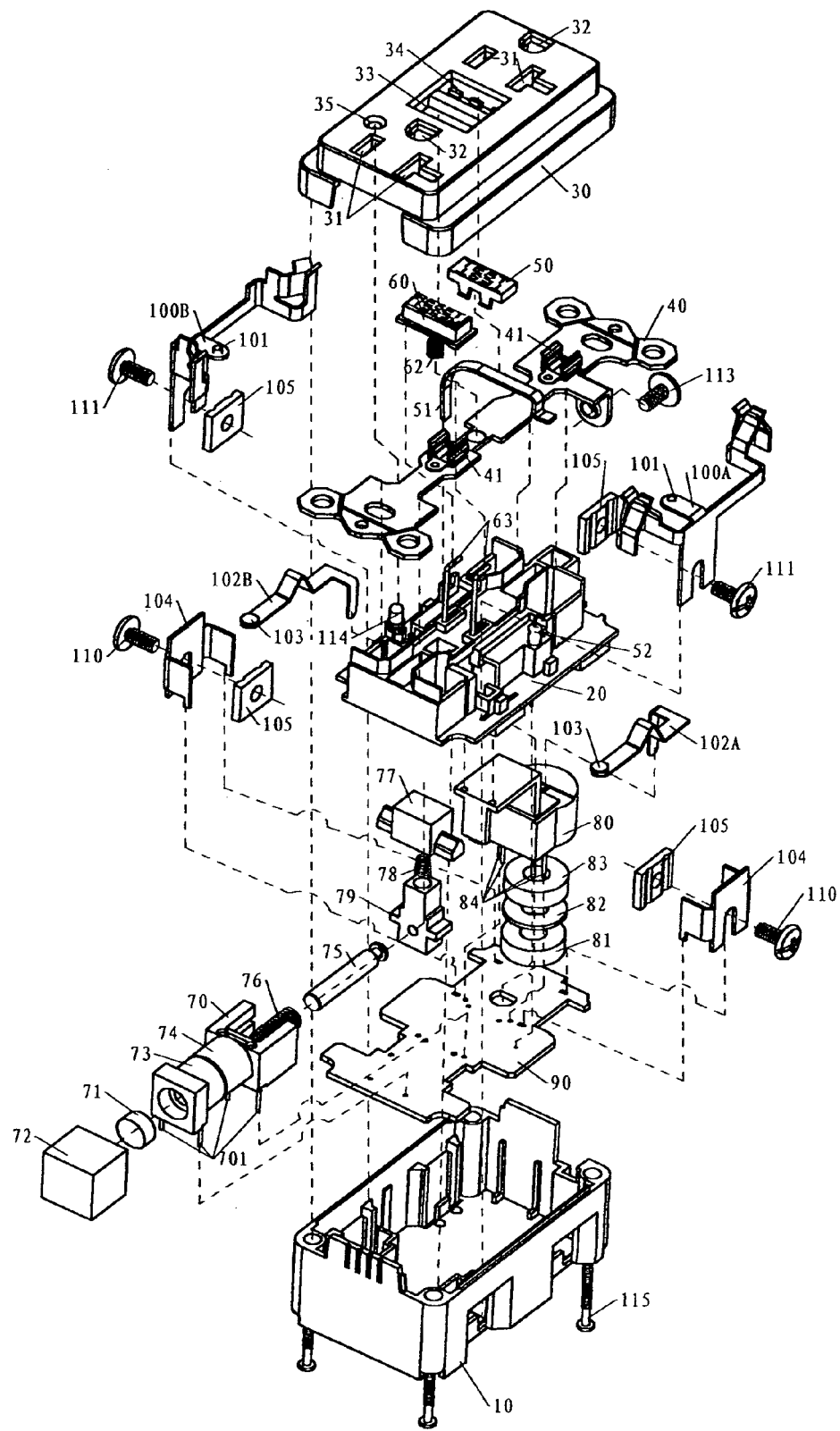
FIG. 4 is an exploded, perspective view of the GFCI in FIG. 1.

FIG. 4 is an exploded view of the GFCI receptacle according to an embodiment of the present invention. As shown, the GFCI receptacle comprises a rear portion 10, a central body 20, a face portion 30, a mounting strap with a grounding strap 41 and a binding screw 113, a pair of movable contact holders 102A and 102B with contacts 103, a pair of fixed contact holders 100A and 100B with contacts 101, an actuator, a reset mechanism, a test mechanism and a control circuit. The actuator comprises a coil framework 70, a permanent magnet 71, a shield cover 72, a closing coil 73, a trip coil 74, a plunger 75, a trip spring 76, a balance frame 77, a small spring 78 providing a contact force, a movable bracket 79, and four binding pins 701. The reset mechanism includes a reset button 60 molded with a contact strap 61 (shown in FIG. 3), a reset spring 62, and a reset binding pin 63. The test mechanism includes a test button 50, a test strap 51, a test resistor 52, a sensor framework 80, a sensing transformer 81, an isolation layer 82, and a neutral transformer 83. In addition, the line terminal 104 is connected to the line wire by the line binding screw 110 associated with the pressure plate 105; the load can also be connected to the GFCI through the load binding screw 111 and a corresponding pressure plate 105. All subassemblies and component parts are assembled as shown in the drawing. The rear portion and the face portion of the housing are connected together by four fastening screws 115. The reset button 60 extends through the reset opening 33 on the face portion 30 of the housing. The test button 50 extends through the test opening 34 on the face portion 30 of the housing. One of the ends of each of the movable contact holders 102A and 102B passes through the sensor framework 80 and is soldered onto the circuit board 90. The other end of each can move freely.

Figure 5:
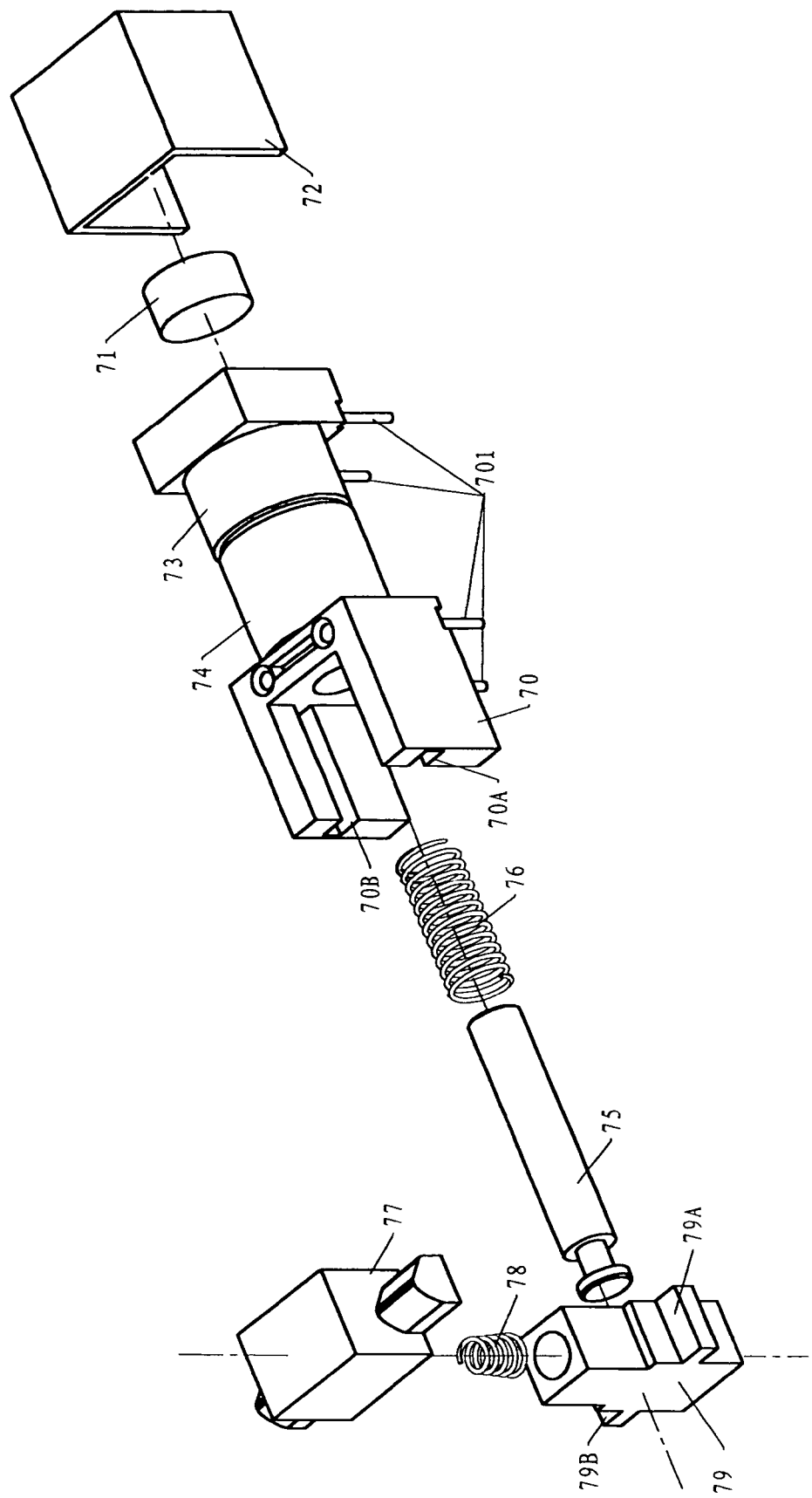
FIG. 5 is an exploded view of the electromagnetic tripper of the GFCI in FIG. 1.
Figure 6:
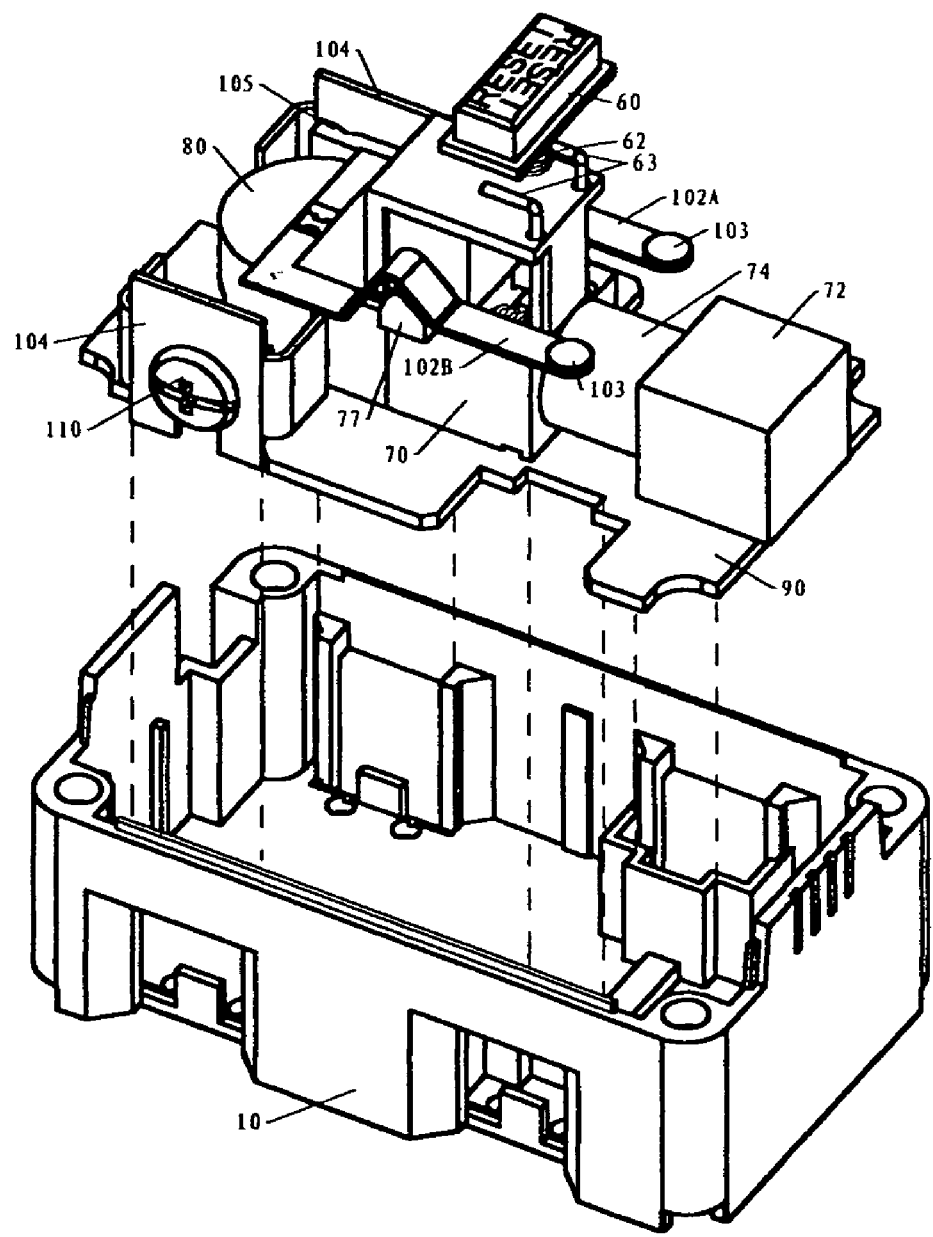
FIG. 6 is a perspective view of the trip actuator and a portion of the GFCI in FIG. 1, showing the assembled relationship of the trip actuator.

FIG. 5 is an exploded view of the electromagnetic tripper of FIG. 4. Because the plunger 75 is molded onto the movable bracket 79, the movement of the plunger 75 can drive the sliding boards 79A and 79B to move back and forth in the runners 70A and 70B, respectively. The movement of the movable bracket 79 drives the balance 77 to move to perform the operation of breaking contact and making contact (between the fixed and movable contacts). The assembled relationship of the electromagnetic tripper is further shown in FIG. 6.

Figure 7:
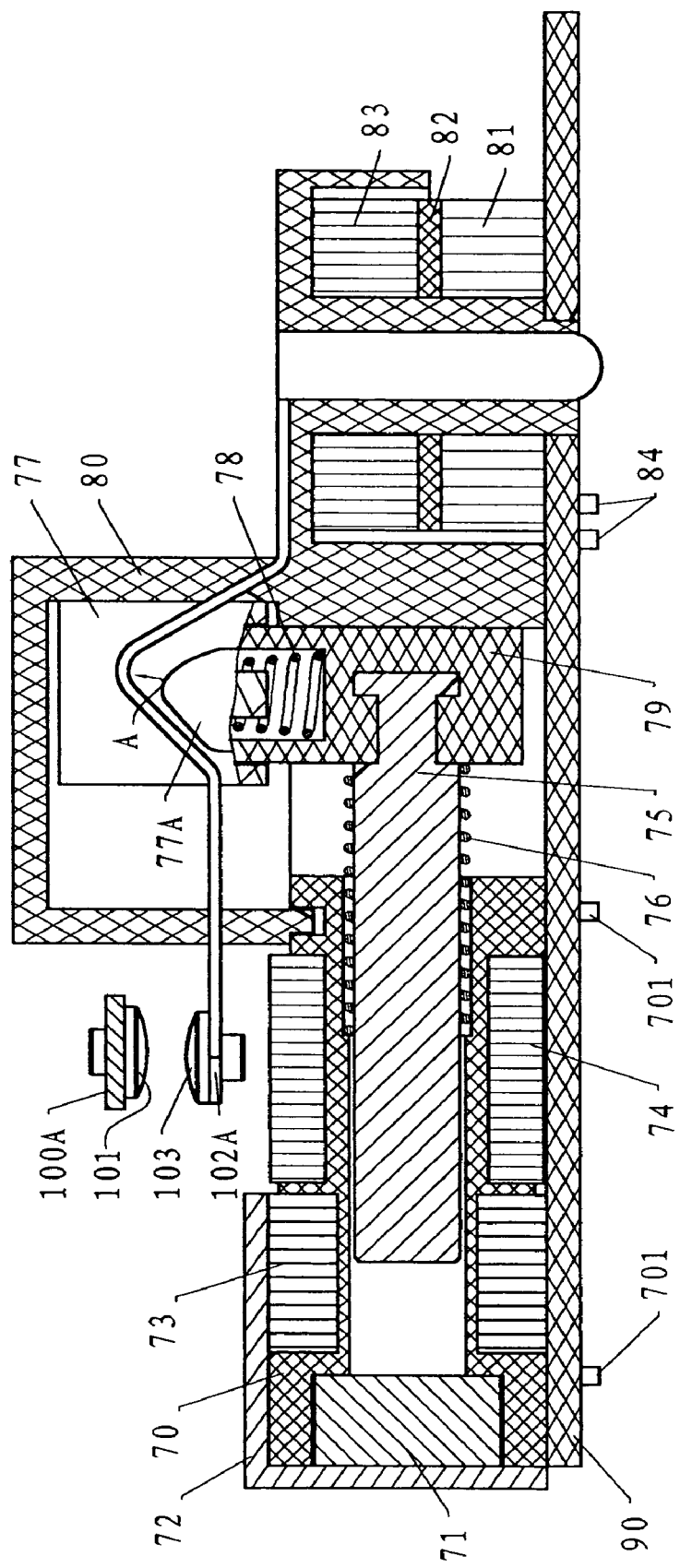
FIG. 7 is a detailed, sectional side view of the GFCI in FIG. 1 in the tripped condition.
Figure 8:
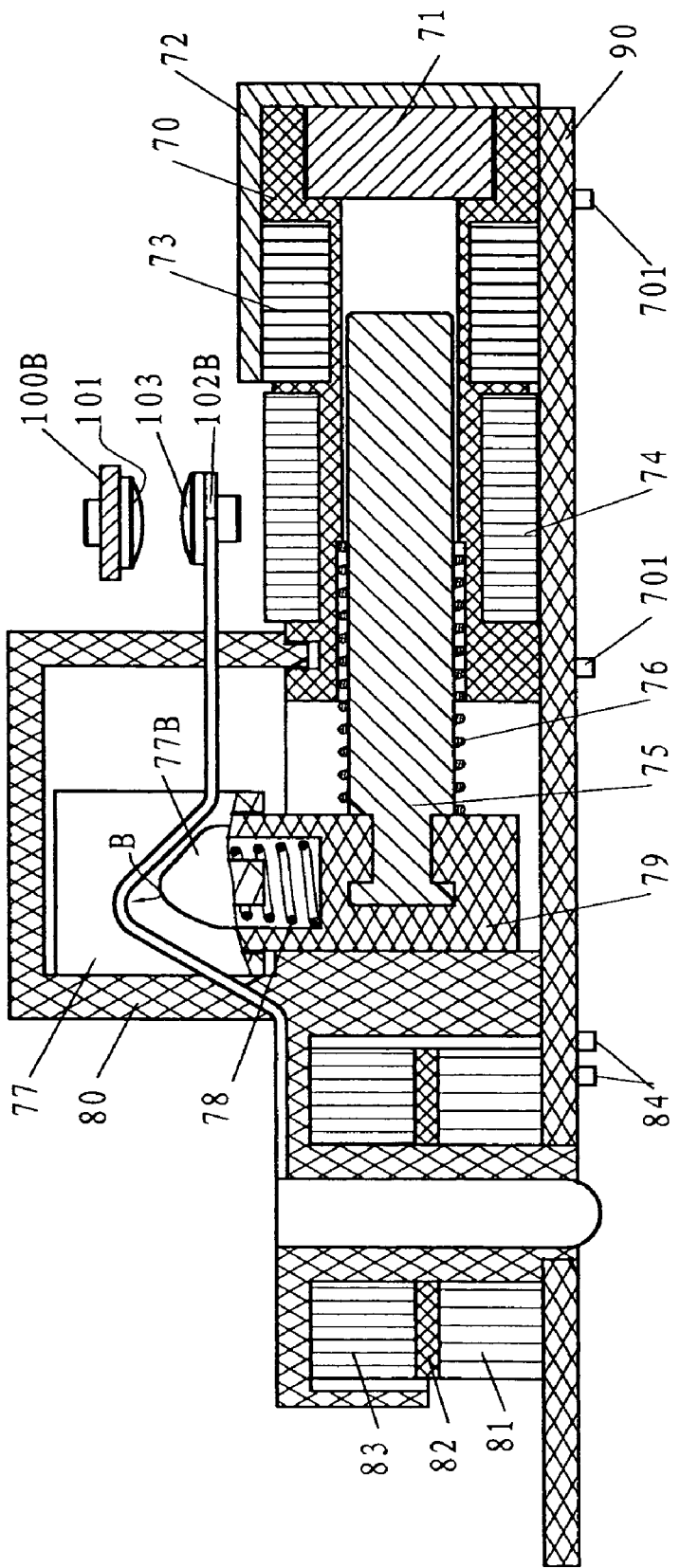
FIG. 8 is another detailed, sectional side view of the GFCI in FIG. 1 in the tripped condition from a different perspective from FIG. 7.
Figure 9:
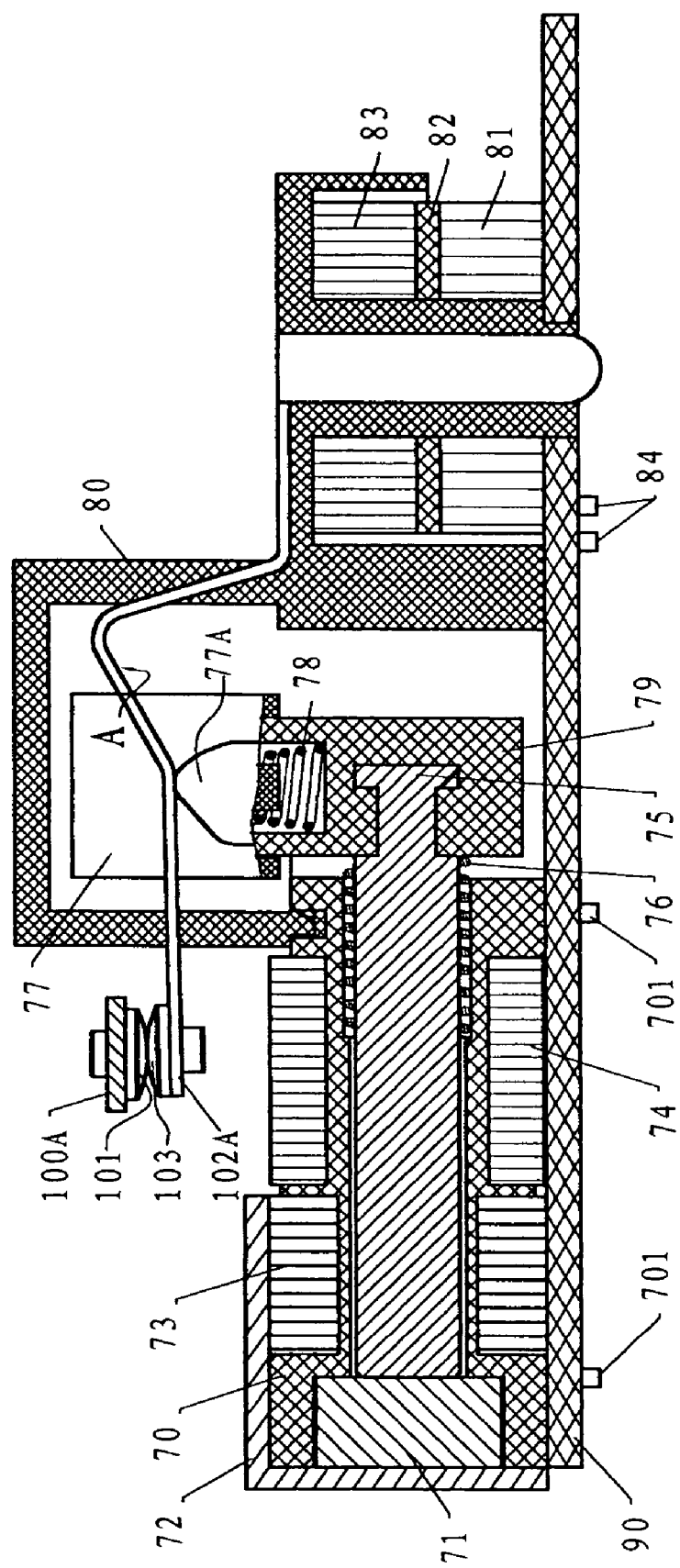
FIG. 9 is a detailed, sectional side view of the GFCI in FIG. 1 in the closed condition.

Referring now to FIGS. 7, 8, and 9, when the trip coil 74 or the closing coil 73 is energized, it produces a corresponding electromagnetic force to interact with the magnetic force of the permanent magnet 71 and acts on the plunger 75. In this manner, the plunger 75 drives the balance frame 77 back and forth. In the trip condition, when trip coil 74 is energized, the bracket 77A of the balance frame 77 is set into the V-shaped groove A of the movable contact holder 102A, and the bracket 77B of the balance frame 77 is set into the V-shaped groove B of the movable contact holder 102B, as shown in FIGS. 7 and 8. As a result, the contacts 101 and 103 are separated from each other.

On the other hand, when the closing coil 73 is energized, the plunger 75, under the magnetic force, drives the balance frame 77 to move such that the brackets 77A and 77B on the two sides of the balance frame 77 force the movable contact holders to bias. When one end of the plunger 75 is attracted to and pressed against the permanent magnet 71 (i.e., when closing coil 73 is energized), the brackets on two sides of the balance frame 77 are located on the plane position of the V-shaped groove and hold the contacts 103 of the movable contact holders against the contacts 101 of the fixed contact holders, as shown in FIG. 9. The small spring 78 provides a contact force for the contacts 103 and 101 to help maintain the contact. The special shape of the movable contact holders 102A and 102B prevents the plunger 75 from being attracted and closed in the event of improper operation and also contributes to making the tripper act quickly.

Figure 10:
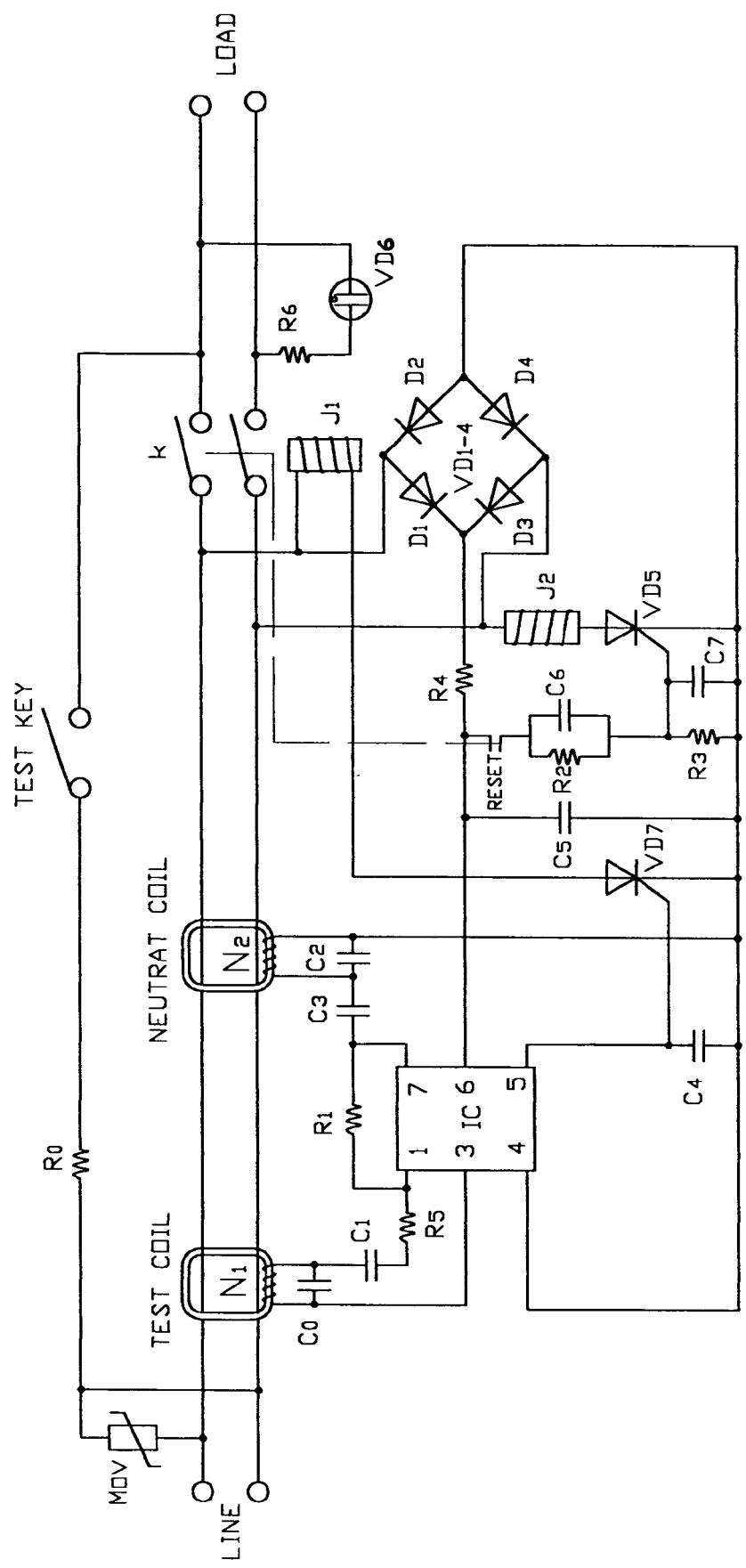
FIG. 10 is a schematic diagram of a circuit of the GFCI according to an embodiment of the present invention.

FIG. 10 shows a general GFCI circuit of the present invention. Diodes $D_1$-$D_4$ form a rectifying circuit, converting the AC input to a DC output. The junction of $D_1$ and $D_2$ and the junction of $D_3$ and $D_4$ form the AC input terminals and are connected to the line of the GFCI. The junction of $D_2$ and $D_4$ forms one terminal for the DC output, and this junction is referred to as the "ground" hereinafter. The junction of $D_1$ and $D_3$ forms the other terminal of the DC output and connects with the resistor $R_4$. The other end of $R_4$ is connected to the capacitor $C_5$. The other end of $C_5$ is then connected to the "ground". In the exemplary 20 A-rated GFCI device, an electrical voltage of approximately 26V formed between the two ends of C5 serves as a DC voltage for the circuit.

As discussed above, the exemplary ground fault circuit interrupter has a sensor, a trip circuit, a test circuit and a reset circuit. The sensor has a sensing transformer $N_1$ and a neutral transformer $N_2$, as shown in FIG. 10. The AC line and the neutral conductors pass through both transformers. The two ends of a sensing coil of sensing transformer $N_1$ connect to opposite ends of the capacitor $C_0$. One end of the sensing coil of $N_1$ serially connects to the capacitor $C_1$, the resistor $R_5$, and then the terminal 1 of the IC (which, as discussed below, may include an amplifier circuit), and the other end of the sensing coil of $N_1$ connects to the terminal 3 of the IC, forming a transformer-coupled circuit that receives differential voltage inputs. The feedback resistor, $R_1$, connects to the terminal 1 of the IC at one end and to the terminal 7 of the IC at the other end. The magnitude of resistance at $R_1$ determines the amplification of the IC, that is, the threshold value for the tripping action of the GFCI.

The neutral transformer $N_2$, the capacitor $C_2$, and the capacitor $C_3$ form the neutral ground-fault protection circuit. The two ends of the sensing coil of neutral transformer $N_2$ are connected to opposite ends of the capacitor $C_2$. One end of the sensing coil of $N_2$ is further connected to the capacitor $C_3$ and the other end of the sensing coil of $N_2$ is connected to the "ground". The other end of the capacitor $C_3$ is connected to the terminal 7 of the IC.

Given the above-described apparatus, neutral ground-fault protection occurs as follows: The transformers $N_1$ and $N_2$ form a sigmoid-wave oscillator with a transformer-coupled oscillating frequency of 5 kHz. When a neutral ground fault occurs, this oscillator starts to oscillate. When the magnitude of the oscillation reaches the IC threshold value, then the terminal 5 of the IC delivers a signal, putting the tripper in motion and the GFCI breaks contact. In other words, in operation, the sensing transformer ($N_1$) serves as a differential transformer for detecting a current leakage between the line side of the load terminal and an earth ground, while the neutral transformer ($N_2$) detects current leakage between the neutral side of the load terminal and an earth ground. In the absence of a ground fault condition, the currents flowing through the conductors will be equal and opposite, and no net flux will be generated in the core of the sensing transformer ($N_1$). In the event that a connection occurs between the line side of the load terminal and ground, however, the current flowing through the conductors will no longer precisely cancel and a net flux will be generated in the core of the sensing transformer ($N_1$). When the flux increases beyond a predetermined value, it will give rise to a potential at the output of the sensing transformer ($N_1$), which is applied to the inputs 1 and 3 of the IC and trip circuit, sufficient to produce a trip signal on the output terminal 5. If the ground fault condition results from the neutral side of the load terminal being connected to ground, a magnetic path is established between the sensing transformer ($N_1$) and the neutral transformer ($N_2$). When this occurs, a positive feedback loop is created around an operational amplifier within the IC and trip circuit, and the resulting oscillations of the amplifier (IC) will cause the trip signal to appear on the output terminal 5.

As discussed above, resistor $R_1$ is utilized as a feedback resistor for setting the gain of the circuit and, hence, its sensitivity to ground faults. The capacitors $C_1$ and $C_3$ provide AC input coupling. In the absence of a ground fault condition, no output is produced by the amplifier (IC) and trip circuit on the output terminal 5. Under these circumstances, the negative pole of a silicon controlled rectifier (SCR) $VD_7$ is connected to the ground of the full-wave bridge rectifier formed by $D_1$-$D_4$ (described in detail above), and the positive pole of the SCR $VD_7$ is connected to trip coil $J_1$ to maintain it in a non-conducting state. Similarly, the negative pole of an SCR $VD_5$ is connected to the ground of the full-wave bridge rectifier, and the positive pole of the SCR $VD_5$ is connected to closing coil $J_2$ to maintain it in a non-conducting state. Since the current drawn by the resistor $R_4$ and amplifier and trip circuit is not sufficient to operate the trip coil, the plunger remains motionless.

The occurrence of a ground fault condition causes the amplifier and trip circuit to produce an output on terminal 5 of the IC, which is applied to the gate terminal of the SCR $VD_7$, thereby rendering the SCR $VD_7$ conductive. This produces a short circuit across the outputs of the full-wave bridge rectifier, thereby providing a low-impedance path for current to flow through the trip coil $J_1$. The resulting movement of the plunger causes the movable contacts to move to the open position, thereby removing power from the entry ports of the face portion and the load terminals. This ensures that the GFCI receptacle remains in a condition to detect a ground fault condition immediately upon being reset.

The reset switch RESET, the resistors $R_2$ and $R_3$, the capacitors $C_6$ and $C_7$, the SCR $VD_5$, the closing coil $J_2$, and the breaking switch K form the reset control circuit. One end of the reset switch RESET is connected to the junction of $R_4$ and $C_5$, the other end of the reset switch RESET is connected to one junction of $R_2$ and $C_6$, which are connected in parallel. The other junction of $R_2$ and $C_6$ is connected to the gate pole of the SCR $VD_5$, $R_3$, and $C_7$. Capacitor $C_7$ is connected between the gate and cathode of the SCR $VD_5$ to serve as a filter for preventing narrow noise pulses from triggering the SCR $VD_5$. One end of the breaking switch K is connected to the line terminal; the other end of K is connected to the load terminal. It is noted that the contact point between the breaking switch K and the line terminal corresponds to the contact 103 of the movable contact holder, and the contact point between the breaking switch K and the load terminal corresponds to the contact 101 of the fixed contact holder. The power supply of the control circuit is connected to the line of the GFCI, so when the GFCI is energized, the control circuit of the GFCI is also energized. When the reset switch RESET is closed, the capacitor $C_6$ is charged up, generating a trigger signal of about 20-40 ms to gate the SCR $VD_5$ into conduction. Consequently, the closing coil 73 is energized for a duration of about 20-40 ms. That is, the closing coil 73 produces an electromagnetic force for about 20-40 ms to act on the plunger 75, sufficient to reset the GFCI.

The IC may be a special integrated circuit, for example, of type RV4145A or RV2145.

As discussed above, capacitor $C_4$ is connected between the gate and cathode of the SCR $VD_7$ to serve as a filter for preventing narrow noise pulses from triggering the SCR $VD_7$. For additional protective purposes, the circuit shown in FIG. 10 also includes a metal oxide varistor (MOV) connected across the input terminals of the AC power source, in order to protect the whole control circuit from transient voltage surges.

The test switch TEST and the current limiting resistor $R_0$ form the test circuit. The current limiting resistor $R_0$ is connected to the power source, and the other end of resistor $R_0$ is connected to the test switch. The other end of the test switch TEST is connected to the other end of the load. The test circuit constantly provides the GFCI an 8 mA fault current for periodically checking the working status of the GFCI. When the test switch is momentarily depressed, sufficient current will flow through the resistor $R_0$ to cause an imbalance in the current flowing through the sensing transformers. This will simulate a ground fault condition, causing the amplifier and trip circuit to produce an output signal on the output terminal 5, which gates the SCR $VD_7$ into conduction and thereby momentarily energizes the trip coil. The resulting movement of the plunger causes the contacts to open, as will occur during an actual ground fault condition.

Simultaneously, the GFCI receptacle also provides an indication circuit, where a current limiting resistor $R_6$ is connected in series with a light-emitting diode (LED) $VD_6$, and they are connected directly to the terminals of the load. When the reset button is depressed and the GFCI receptacle is energized, the LED is illuminated. This affords a visual indication to the installer and the user that the GFCI receptacle is in the normal conduction state.

If the GFCI receptacle is inadvertently miswired by connecting the line to the load, before the breaking switch K closes, the control circuit is de-energized. Because the GFCI utilizes an electronically-controlled means for reset, when the control circuit is de-energized, the closing coil can not be energized. In this manner, the closing coil can not produce a corresponding electromagnetic force to act on the plunger, thereby keeping the GFCI also de-energized, achieving the reverse wiring protection function.

In summary, the present invention provides a GFCI receptacle that utilizes an electromagnetic tripper and an electronically-controlled means to control reset. This GFCI receptacle has reverse wiring protection function and the advantages of, for example, tripping rapidly and operating conveniently.

Recent changes in electrical standards have indicated the desirability of, instead of having a single fixed contact holder 100A or 100B (each having a respective fixed contact 101) on each side conducting current to/from the line, having a pair of fixed contact holders, one for the GFCI receptacle and one for the output load connection, for each side, phase and neutral, of the GFCI receptacle. By so doing, should the GFCI receptacle be miswired, with the load side wires connected to the binding screws for the line side, and vice versa, no current will be conducted into the GFCI receptacle (i.e., to a user load plugged into the receptacle). The invention is adaptable to this type of arrangement, and FIGS. 11 and 12 depict embodiments of the invention that have such arrangements.

Figure 11:
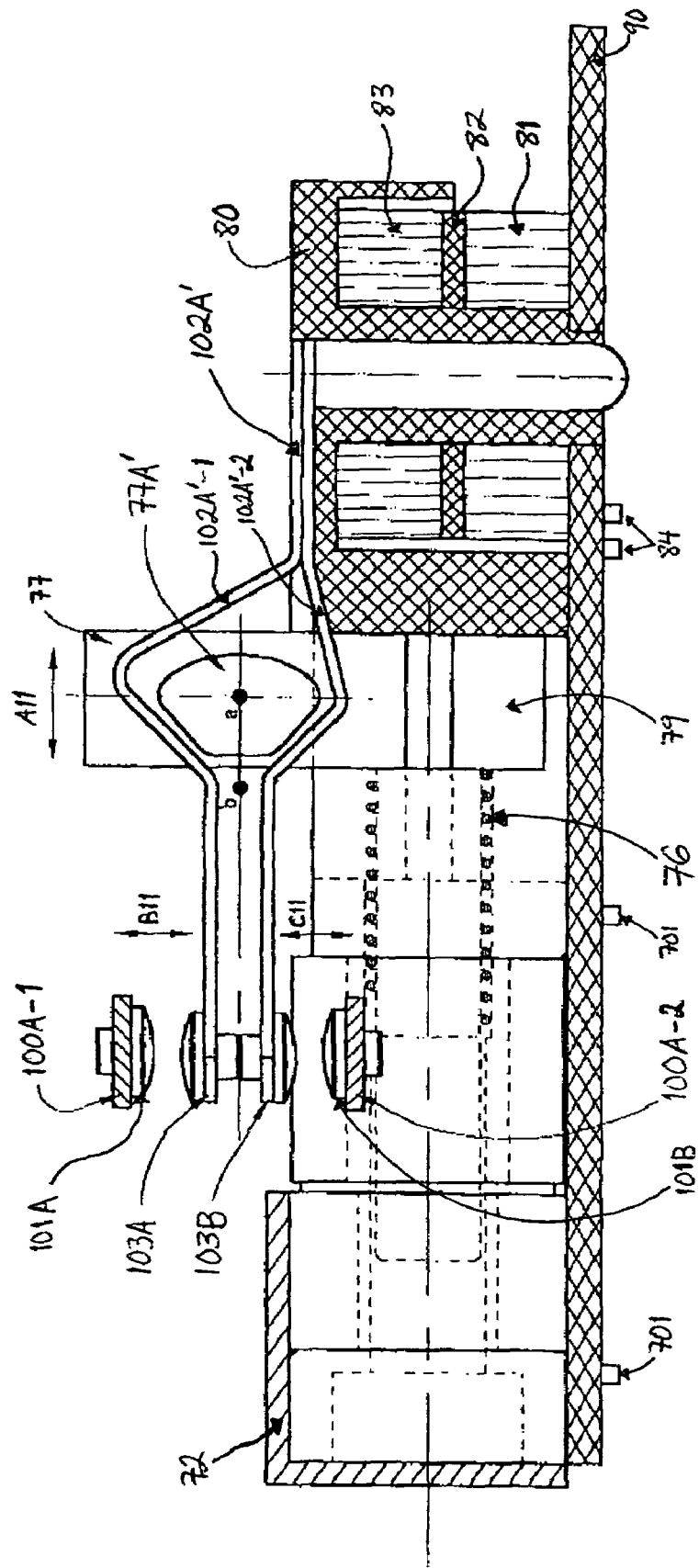
FIG. 11 is a detailed, sectional side view of the GFCI in the tripped condition, according to a further embodiment of the invention.
Figure 12:
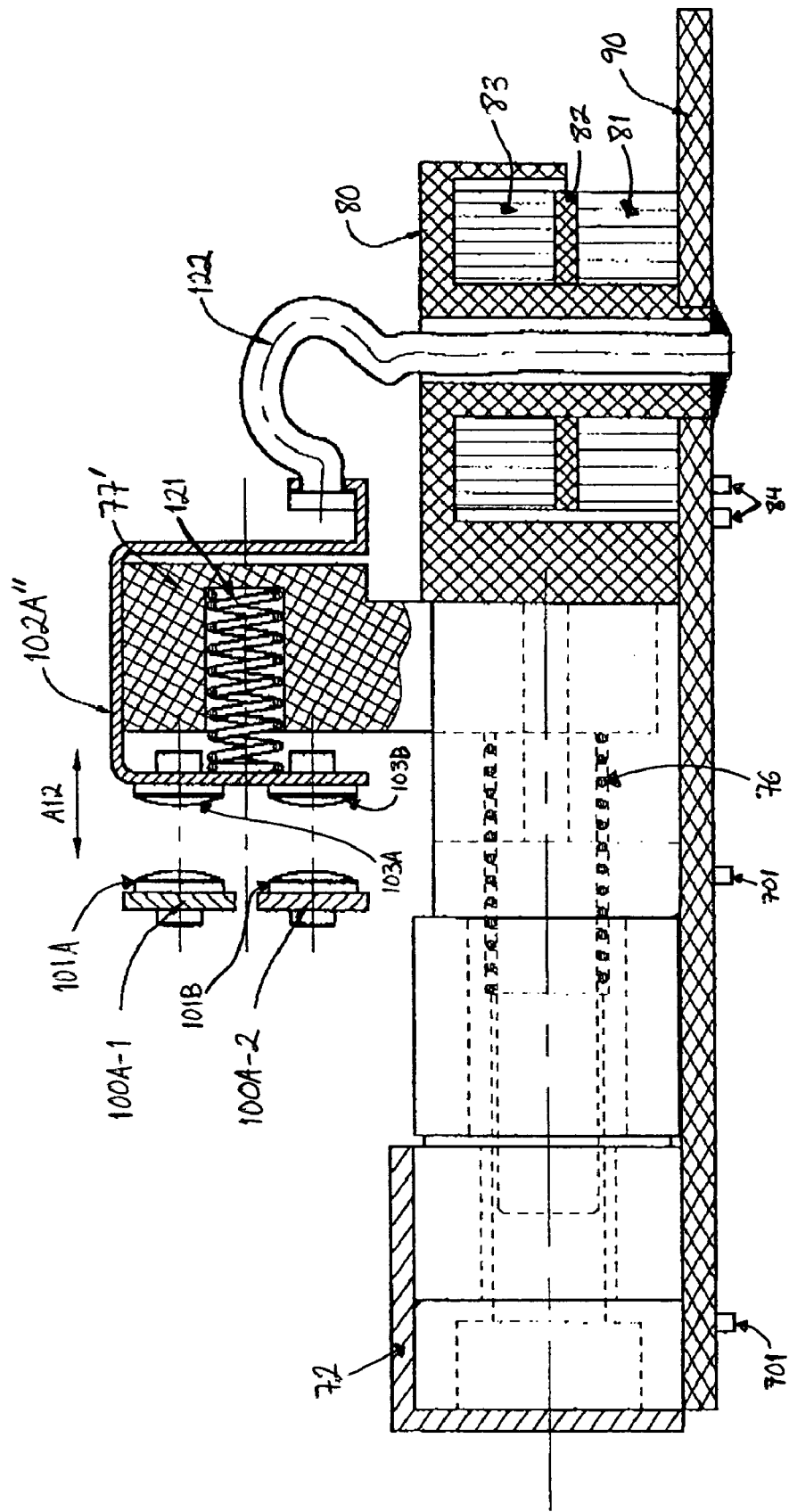
FIG. 12 is a detailed, sectional side view of the GFCI in the tripped condition, according to a further embodiment of the invention.

In the embodiment shown in FIG. 11, which shows a side view of the GFCI in the tripped position, the single movable contact holder on each side (the view shown corresponds to the view shown in FIG. 7, so the equivalent movable contact holder in FIG. 7 is 102A) is replaced with a movable contact holder assembly 102A'. Movable contact holder assembly 102A' comprises two movable contact holder elements, 102A'-1 and 102A'-2. Each of the movable contact holder elements 102A'-1 and 102A'-2 has a V-shaped bend. Movable contact holder elements 102A'-1 and 102A'-2 are arranged against each other at one end, as shown, with the V-shaped bends arranged opposite each other. At the end where they are arranged against each other, the two movable contact holder elements 102A'-1 and 102A'-2 electrically connected to a line-side conductor, which comes through the sensor assembly 80; alternatively, the two movable contact holder elements 102A'-1 and 102A'-2 may extend through the sensor assembly 80 and electrically connected (e.g., soldered) directly to printed circuit board 90 to provide contact with the line-side conductor. At the other end, each movable contact holder element, 102A'-1 or 102A'-2, has a movable contact, 103A or 103B, respectively. The movable contacts 103A and 103B, as well as fixed contacts 101A and 101B, may, for example, be riveted, soldered, or otherwise electrically connected to their respective contact holders, or they may, as a further example, comprise conductive rivets.

As in the previous embodiments, the GFCI includes a movable bracket 79 and a balance frame 77 mounted on the movable bracket 79. Alternatively, movable bracket 79 and balance frame 77 may be combined into a unitary structure; while the remainder of this description is written under the assumption of separate components, it is equally applicable to the unitary design.

Balance frame 77 is equipped with a bracket 77A' extending from each side (see also, for example, FIG. 5). In this embodiment, however, bracket 77A' has a somewhat different shape from bracket 77A as shown in FIG. 7. In particular, bracket 77A' is shaped so as to be able to separate movable contact holder elements 102A'-1 and 102A'-2, in the directions of arrows B11 and C11, when bracket 77A' is moved from point a to point b, in the direction of arrow A11. The amount of separation of movable contact holder elements 102A'-1 and 102A'-2, when bracket 77A' is at point b, must be sufficient to cause movable contacts 103A and 103B to make contact with fixed contacts 101A and 101B. As shown in FIG. 11, the shape of bracket 77A' may be as if a bracket 77A were fused to a second bracket 77A that was flipped vertically, however, bracket 77A' may take any other suitable shape such that it fits between the V-shaped grooves of movable contact holder elements 102A'-1 and 102A'-2 when in the trip position (a) and such that it causes sufficient separation of movable contact holder elements 102A'-1 and 102A'-2 when in position b. Typical shapes of bracket 77A' include a rounded trapezoidal shape, as shown in FIG. 11, and a rounded triangular shape.

Figure 14:
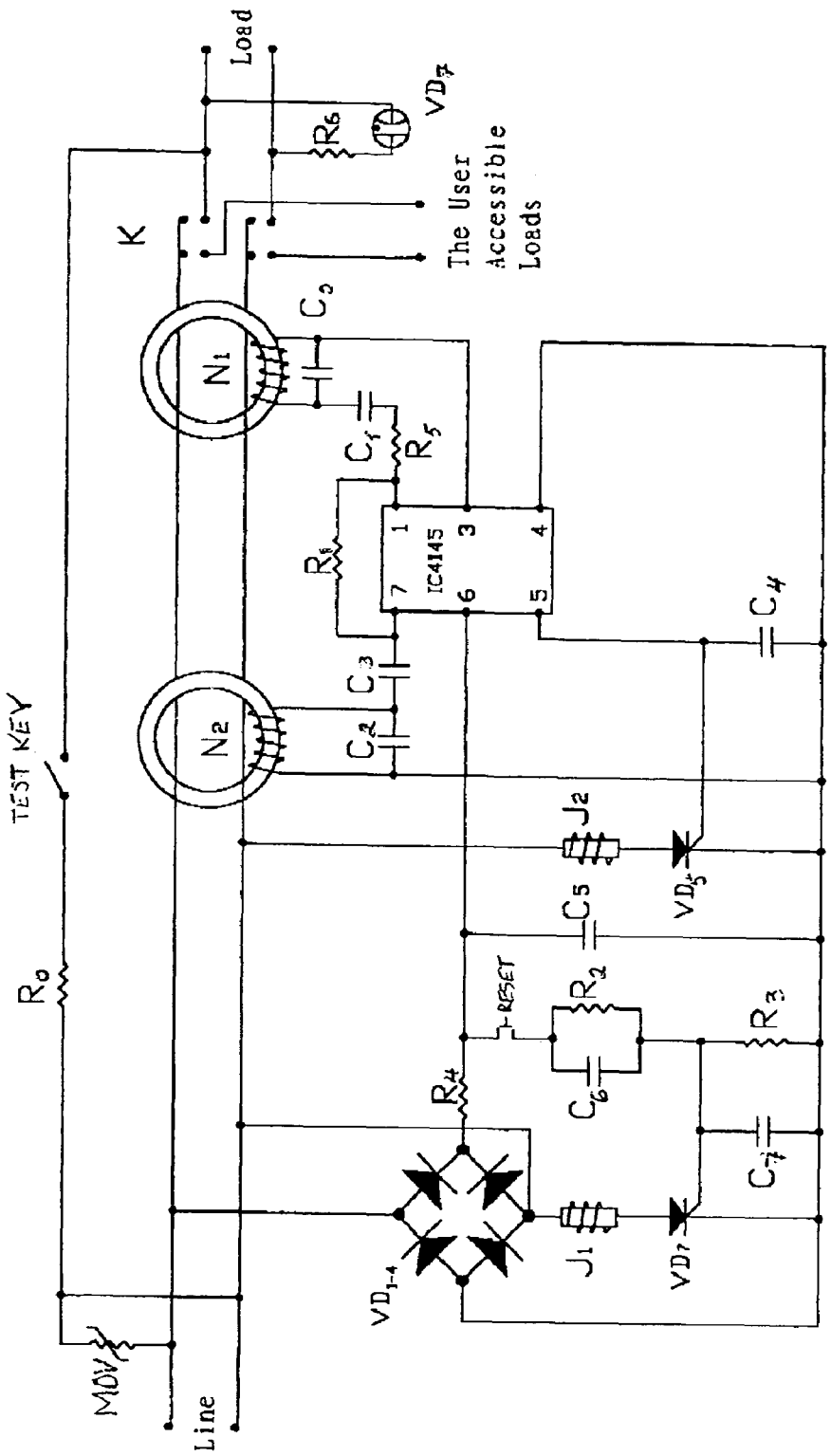
FIG. 14 is a modified version of the circuit diagram of FIG. 10 showing the split version of the fixed contact holder as in FIGS. 13A-13C.

In order to provide separate conductive paths on each side (neutral and phase) of the GFCI for conduction of electricity to/from the receptacle and to/from the output load conductor, fixed contact holders 100A and 100B (as shown, e.g., in FIG. 4) are each split into two parts. This is depicted conceptually in FIGS. 13A-13C, which show a split version of fixed contact holder 100A. This is also depicted in the circuit diagram shown in FIG. 14, as part of switching apparatus K; the circuit of FIG. 14 operates in a manner similar to that shown in FIG. 10, and will, therefore, not be further described (like parts have been labeled with identical reference numerals). In particular, fixed contact holder 100A is split into first contact holder component 100A-1, shown in FIGS. 13A and 13B, and second contact holder component 100A-2, shown in FIG. 13C. In the depiction of FIGS. 13A-13C, the first contact holder component 100A-1 is connected to an output load via binding screw 111. First contact holder component 100A-1 includes a contact holder part 100A-1', on which is situated fixed contact 101A. Second contact holder component 100A-2 is shown connected to (one side of) an electrical outlet. Second contact holder component 100A-2 includes a contact holder part 100A-2', on which is situated fixed contact 101B. First and second contact holder components 100A-1 and 100A-2, including contact holder parts 100A-1' and 100A-2', are shaped and oriented in a manner appropriate to the particular embodiment and implementation of the invention (e.g., as shown in FIG. 11 or FIG. 12).

The sub-embodiment of FIG. 11 operates as follows. In the tripped position, bracket 77A' is located at point a, where it fits within the V-shaped grooves of movable contact holder elements 102A'-1 and 102A'-2. In this position, no contact is made between movable contacts 103A and 103B and fixed contacts 101A and 101B, respectively. When the reset button 60 (see, e.g., FIG. 6) is pressed (assuming the absence of a reverse wiring or other fault condition), the reset mechanism described above causes movable bracket 79 (and, hence, balance frame 77) to move along the direction of arrow A11, which, in turn, causes bracket 77A' to move from point a to point b. This causes the ends of movable contact holder elements 102A'-1 and 102A'-2 having movable contacts 103A and 103B, respectively, to separate (i.e., along the directions of arrows B11 and C11, respectively). This, in turn, causes movable contacts 103A and 103B to make contact with fixed contacts 101A and 101B, thus permitting the conduction of current to/from, for example, an electrical appliance plugged into the GFCI receptacle and to/from an output load terminal (e.g., binding screw 111, as shown, for example, in FIG. 3).

On the other hand, when bracket 77A' is initially at point b and a fault (or test) occurs, movable bracket 79 (and balance frame 77, along with it) moves in the direction along arrow A11 so as to move bracket 77A' to point a. As a result, the ends of movable contact holder components 102A'-1 and 102A'-2 bearing movable contacts 103A and 103B are no longer kept apart by bracket 77A', which is now situated in the area formed by the V-shaped bends in movable contact holder components 102A'-1 and 102A'-2. As a result, contact between movable contacts 103A and 103B and fixed contacts 101A and 101B, respectively, is broken.

In the sub-embodiment shown in FIG. 12, the movable contact holder 102A" is mounted on a movable assembly 77', which is the equivalent of movable bracket 79 and balance frame 77 of FIG. 4, but without any brackets 77A (and which may be of unitary construction), and is connected to a flexible conductor 122 at one end. The other end of the movable contact holder 102A" is provided with the two movable contacts, 103A and 103B, which make contact with the two fixed contacts, 101A and 101B, when the movable assembly 77' is in a first position (reached, e.g., by pressing reset button 60). The movable and fixed contacts do not make contact when the movable assembly 77' is in a second (tripped) position, which is what is depicted in FIG. 12. That is, the entire movable contact holder 102A" is arranged to shift in the direction along arrow A12 when a condition causes movable assembly 77' to shift in the direction along arrow A12. Note that while FIG. 12 depicts, and this discussion describes, only one side of the apparatus, and thus only a single movable contact holder 102A", there are actually two movable contact holders, one connected to each of two conductors (phase and neutral), both of which are mounted on movable assembly 77'.

Movable assembly 77' is further equipped with a contact spring 121. The force provided by contact spring 121 serves to ensure good contact between movable contacts 103A and 103B and fixed contacts 101A and 101B.

As discussed above, movable assembly 77' in FIG. 12 is the equivalent of movable bracket 79 and balance frame 77 of FIG. 4. As a result, movable assembly 77' is coupled to and driven by plunger 75 in the same fashion as is movable bracket 79 in the embodiment of FIG. 4.

The sub-embodiment of FIG. 12 operates as follows. FIG. 12 shows the movable assembly 77' in the tripped position (i.e., in its right-hand position along the direction of arrow A12 in FIG. 12). In this position, no contact is made between movable contacts 103A and 103B and fixed contacts 101A and 101B, respectively. When the reset button 60 (see, e.g., FIG. 6) is pressed (assuming the absence of a reverse wiring or other fault condition), the reset mechanism described above causes movable assembly 77' to move along the direction of arrow A11, in the left-hand direction in FIG. 12 (i.e., toward fixed contact holders 100A-1 and 100A-2). This causes the movable contact holder 102A" to move as well. This, in turn, causes movable contacts 103A and 103B to make contact with fixed contacts 101A and 101B, thus permitting the conduction of current to/from, for example, an electrical appliance plugged into the GFCI receptacle and to/from an output load terminal (e.g., binding screw 111, as shown, for example, in FIG. 3).

On the other hand, when movable assembly 77' is initially in its left-hand position (as it would be following the operations in the previous paragraph) and a fault (or test) occurs, movable assembly 77' moves in the right-hand direction along arrow A12, as shown in FIG. 12. As a result, movable contact holder 102A" bearing movable contacts 103A and 103B is moved in the right-hand direction, away from fixed contact holders 100A-1 and 100A-2. As a result, movable contacts 103A and 103B and fixed contacts 101A and 101B, respectively, are separated, and contact is broken.

While the above discussion focuses on the specific implementation of the sub-embodiment of FIG. 12, it is apparent that variations are possible. For example, contact holder 102A" need not cover or surround (part of) movable assembly 77', as shown in FIG. 12. Contact holder 102A" need only be attached to movable assembly 77' and provide movable contacts 103A and 103B in a position for making contact with fixed contacts 101A and 101B when movable assembly 77' moves contact holder 102A" into an appropriate position. For example, if movable assembly 77' has a squared shape, as shown in FIG. 12, contact holder 102A" need only be a conductive plate on which movable contacts 103A and 103B are mounted, and contact with flexible conductor 122 may be provided by electrically connecting flexible conductor 122 to spring 121, which may be made of a conductive material and have a portion extending through a side or back of movable assembly 77' to accommodate such electrical connection. Alternatively, spring 121 may be omitted, and the flexible conductor 122 may be inserted through a hole in movable assembly 77' to make contact with contact holder 102A", or some other type of electrical connection (e.g., a conductive post extending through the back of movable assembly 77') may be provided between contact holder 102A" and flexible conductor 122.

Furthermore, movable assembly 77' may take on numerous shapes and forms. As discussed above, it may be of unitary form, and both movable contact holders (for the phase and neutral sides) may be mounted on it. Additionally, for example, movable assembly 77' may have a base portion coupled to the plunger from which extend two supports, on each of which is mounted one of the movable contact holders. Movable assembly 77' may, alternatively, comprise a phase side movable assembly and a neutral side movable assembly, both of which are coupled to, and move with, the plunger.

Flexible conductor 122 may comprise a pair of conductors (e.g., two mutually insulated wires) together (one for phase and one for neutral), or there may be two flexible conductors, where flexible conductor 122, as shown in FIG. 12, would be one of them. In the conductive contact spring implementation, for example, as discussed above, each flexible conductor, or each of the conductors within the flexible conductor, would be electrically connected to one of the two contact springs.

FIG. 15 depicts a variation on the sub-embodiment shown in FIG. 12. In this variation, the flexible conductor 122 is split into two portions, both of which are electrically connected to a line-side conductor. For example, in the specific implementation shown, a conductive assembly 123, which may, for example, comprise copper, extends through sensor assembly 80, and the two portions of flexible conductor 122 are coupled (e.g., soldered or otherwise coupled) to conductive assembly 123. Alternatively, the two portions of flexible conductor 122 may be dual extensions of conductive assembly 123.

In the variation of FIG. 15, the movable contact holder 102A" of FIG. 12 is split into two portions, similar to the sub-embodiment of FIG. 11, denoted 102A'-1 and 102A'-2. Each of movable contacts 103A and 103B is electrically coupled to a respective one of the movable contact holder portions 102A'-1 and 102A'-2. Movable contact holder portions 102A'-1 and 102A'-2 are shown extending through movable assembly 77', and each is electrically connected to the one of the respective portions of flexible conductor 122. Movable contact holder portions 102A'-1 and 102A'-2 may include projections that prevent them from becoming dislodged from movable assembly 77'. In conjunction with the two movable contact holder portions, contact spring 121 is shown as being replaced by two contact springs, 121A-1 and 121A-2, each of which helps maintain contact between a respective one of movable contacts 103A and 103B and a respective one of the fixed contacts 101A and 101B. In an alternative embodiment (not shown), a single, non-conducting contact spring may be used to help maintain contact between both pairs of movable and fixed contacts. The operation of this variation of the sub-embodiment of FIG. 12 is substantially as described for the sub-embodiment of FIG. 12.

While only the fundamental features of the present invention have been shown and described, it will be understood that various modifications and substitutions and changes of the form and details of the device described and illustrated and in its operation may be made by those skilled in the art, without departing from the spirit of the invention.

We claim:

1. A ground fault circuit interrupter (GFCI), comprising a switching mechanism, wherein the switching mechanism comprises:
    two pairs of fixed contact holders, each member of each pair having at least one fixed contact at one end;
    a pair of movable contact holders, each having an end having two or more movable contacts, each movable contact being arranged for contacting a respective one of the fixed contacts; and
    a movable assembly that moves from a first position in which each fixed contact is in contact with the respective movable contact to a second position in which each fixed contact is separated from the respective movable contact, and from the second position to the first position, the movable assembly causing movement of the pair of movable contact holders when it moves from the first position to the second position and from the second position to the first position; and
    an electromagnetic mechanism comprising an electromagnetic tripping component configured such that when energized, the electromagnetic tripping component generates a first electromagnetic force that causes the movable assembly to be in the second position, and an electromagnetic resetting component configured such that when energized, the electromagnetic resetting component generates a second electromagnetic force that causes the movable assembly to be in the first position, wherein the electromagnetic tripping component and electromagnetic resetting component are different from one another.

2. The ground fault circuit interrupter as claimed in claim 1, further comprising:
    a control circuit, which, upon detection of a fault condition, energizes the electromagnetic tripping component, and which is responsive to a reset condition for energizing the electromagnetic resetting component.

3. The ground fault circuit interrupter as claimed in claim 2, wherein the control circuit is de-energized upon detection of a fault condition, thereby rendering the ground fault circuit interrupter inoperative.

4. The ground fault circuit interrupter as claimed in claim 2, wherein the movable assembly comprises:
    a plunger partially disposed within the electromagnetic mechanism and configured to move back and forth under magnetic force; and a sub-assembly connected to and driven by the plunger to move along an axial line of the plunger from the first position to the second position and from the second position to the first position, movement of the sub-assembly causing movement of the pair of movable contact holders when the sub-assembly moves from the first position to the second position and from the second position to the first position.

5. The ground fault circuit interrupter as claimed in claim 4, wherein the movable contact holders are mounted on the movable assembly.

6. The ground fault circuit interrupter as claimed in claim 1, wherein each of the pair of fixed contact holders comprises:
a first fixed contact holder having a fixed contact and being electrically coupled to a prong of an electrical outlet; and
a second fixed contact holder having a fixed contact and being electrically coupled to a load output.

7. The ground fault circuit interrupter as claimed in claim 4, wherein the electromagnetic mechanism further comprises a framework having a first end and an opposite, second end, defining a bore therebetween for receiving the plunger of the movable assembly therein, and a permanent magnet secured on the first end of the framework.

8. The ground fault circuit interrupter as claimed in claim 7, wherein the electromagnetic tripping component comprises a trip coil wound on the exterior surface of the framework at a portion proximate to the second end of the framework, and the electromagnetic resetting component comprises a closing coil wound on the exterior surface of the framework at a portion proximate to the first end of the framework, such that
when the trip coil is energized, it generates the first electromagnetic force that repels the magnet force of the permanent magnet, the first electromagnetic force acting on the plunger of the movable assembly to cause the movable assembly to be in the second position; and
when the closing coil is energized, it generates the second electromagnetic force that attracts the magnet force of the permanent magnet, the second electromagnetic force acting on the plunger of the movable assembly to cause the movable assembly to be in the first position.

9. A ground fault circuit interrupter (GFCI) comprising:
a housing;
a pair of movable contact holders, each disposed at least partially within the housing between a line side and a load side, each of the movable contact holders comprising two movable contacts, wherein each of the movable contact holders terminates at a first connection capable of being electrically connected to a source of electricity, a second connection capable of conducting electricity to at least one load, and a third connection capable of conducting electricity to at least one user accessible load;
two pairs of fixed contact holders, each of the fixed contact holders having at least one fixed contact and capable of being electrically connected, through the at least one fixed contact, to a corresponding movable contact holder; and
an electromagnetic mechanism comprising:
a circuit interrupting portion disposed within the housing and configured to generate a first electromagnetic force that causes each movable contact of the pair of movable contact holders to be apart from a corresponding fixed contact of the two pairs of fixed contact holders, thereby causing electrical discontinuity between the line side and the load side upon the occurrence of a predetermined condition; and
a reset portion disposed at least partially within the housing and configured to generate a second electromagnetic force that causes each movable contact of the pair of movable contact holders to be in contact with a corresponding fixed contact of the two pairs of fixed contact holders, thereby reestablishing electrical continuity between the line side and the load side.

10. A ground fault circuit interrupter (GFCI) comprising:
a housing;
a phase conductive path and a neutral conductive path, each disposed at least partially within the housing, between a line side and a load side, wherein each of the phase conductive path and the neutral conductive path comprises:
a pair of movable contact holders; and
at least one flexible conductor electrically coupled to the pair of movable contact holders and electrically coupled to an external electrical connection;
wherein the phase conductive path terminates at a first connection capable of being electrically connected to a source of electricity, a second connection capable of conducting electricity to at least one load, and a third connection capable of conducting electricity to at least one user accessible load, and wherein the neutral conductive path terminates at a first external connection capable of being electrically connected to a source of electricity, a second connection capable of conducting electricity to at least one load, and a third connection capable of conducting electricity to at least one user accessible load;
two pairs of fixed contact holders, each fixed contact holder having at least one fixed contact through which the fixed contact holder is capable of being electrically connected to a corresponding movable contact holder;
a movable assembly on which the movable contact holders are mounted;
four contact springs, each mounted at least partially within the movable assembly and abutting against one of the movable contact holders to provide a contact force to aid contact between a movable contact mounted on a movable contact holder and a corresponding fixed contact; and
an electromagnetic mechanism comprising:
a circuit interrupting portion disposed within the housing and configured to generate a first electromagnetic force that causes each movable contact of the pair of movable contact holders to be apart from a corresponding fixed contact of the two pairs of fixed contact holders, thereby causing electrical discontinuity between the line side and the load side upon the occurrence of a predetermined condition; and
a reset portion disposed at least partially within the housing and configured to generate a second electromagnetic force that causes each movable contact of the pair of movable contact holders to be in contact with a corresponding fixed contact of the two pairs of fixed contact holders, thereby reestablishing electrical continuity between the line side and the load side.

* * * * *